No. 711,279. Patented Oct. 14, 1902.
G. C. BOLGIANO.
SHUTTER FASTENER AND BOWER.
(Application filed July 8, 1902.)
(No Model.)
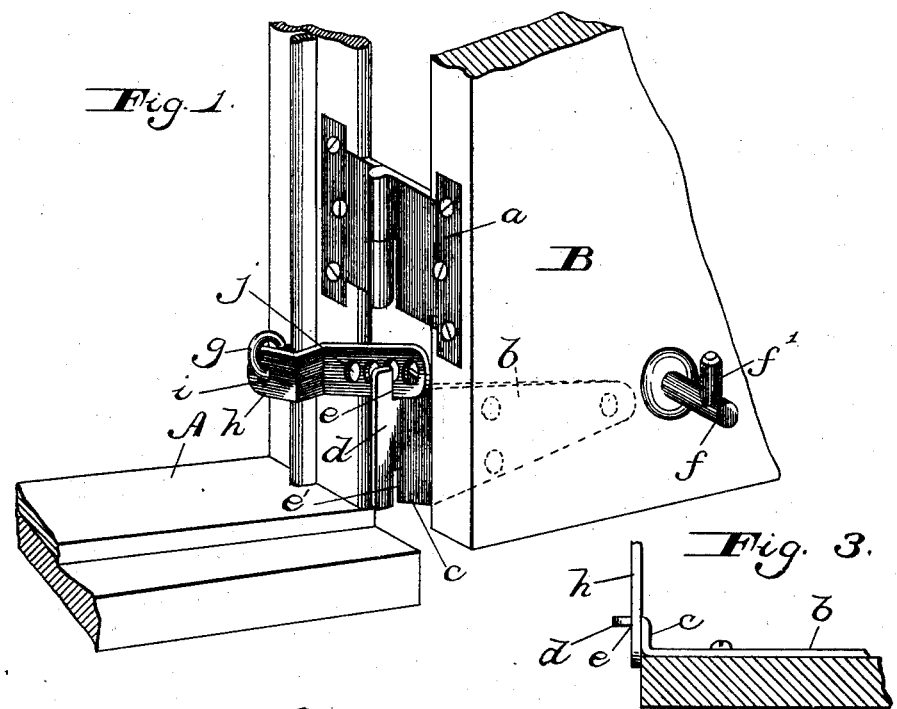
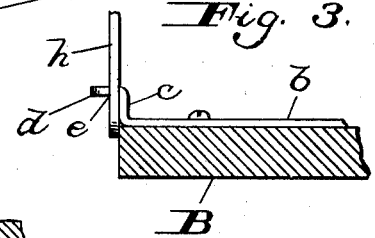
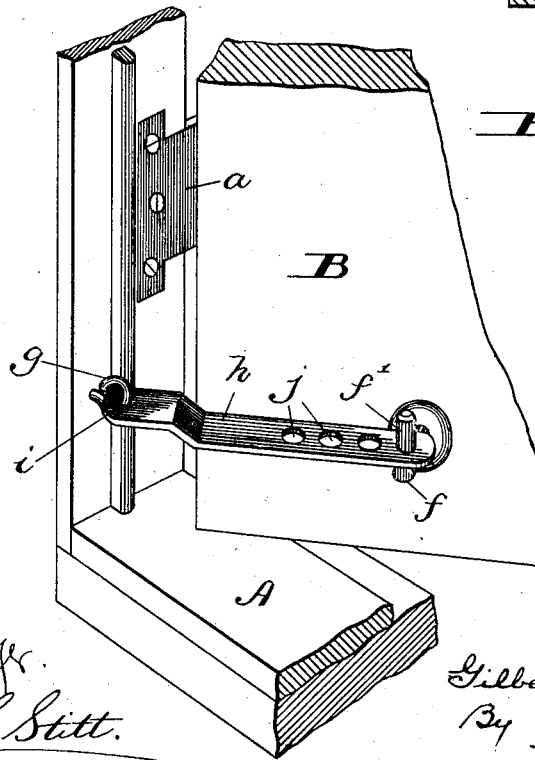
Witnesses
H. J. Meyer Jr.
Frederick S. Stitt.
Inventor.
Gilbert C. Bolgiano
By Mann & Co,
Attorneys.
THE NORRIS PETERS CO., PHOTO-LITHO., WASHINGTON, D. C.

UNITED STATES PATENT OFFICE.

GILBERT C. BOLGIANO, OF BALTIMORE, MARYLAND, ASSIGNOR OF ONE-THIRD TO JOHN F. LANG, OF BALTIMORE, MARYLAND.

SHUTTER FASTENER AND BOWER.

SPECIFICATION forming part of Letters Patent No. 711,279, dated October 14, 1902.

Application filed July 8, 1902. Serial No. 114,757. (No model.)

*To all whom it may concern:*

Be it known that I, GILBERT C. BOLGIANO, a citizen of the United States, residing at Baltimore, State of Maryland, have invented certain new and useful Improvements in Shutter Fasteners and Bowers, of which the following is a specification.

This invention is an improved shutter fastener and bower designed to hold the shutter in a wide-open or completely-closed position and in a partly-open or bowed position.

The object of the invention is to provide an improved device of this character which is of simple and efficient construction and which can be cheaply made.

The invention consists of certain constructions, arrangements, and combinations of parts hereinafter fully described and claimed, reference being had to the accompanying drawings, in which—

Figure 1 is a perspective view of a portion of a window-frame and a shutter with my improved device holding the shutter in open position, the said view being taken from the outside of the window. Fig. 2 is a similar view from the inside of the window, showing the device holding the shutter in the bowed position. Fig. 3 is a detail horizontal sectional view.

Referring to the drawings, the letter A designates a portion of a window-frame, and B designates a portion of a shutter connected thereto by hinges, one of which is shown at $a$.

To that face of the shutter B which is the outer face when the shutter is closed and at the hinged edge thereof is secured a keeper in the form of a plate $b$, provided with an approximately right-angle portion $c$ and an end $d$, projecting therefrom in a plane substantially parallel with the shutter and having in both its top and bottom edges recesses $e\ e'$, preferably at the junction of said end with the right-angle portion $c$, and to the other face of the shutter B, a short distance from the said hinged edge, is secured a pin $f$, provided with an upwardly-extending lug $f'$.

A screw-eye $g$ projects out from one side of the window-frame toward the other side, and a latch-plate $h$ is provided at one end with an aperture $i$, by which it is pivotally connected to said eye. The said latch-plate $h$ is provided at its other or free end with a plurality of holes $j$, as illustrated.

In practice if it is desired to hold the shutter in the wide-open position illustrated in Fig. 1 it is only necessary to turn the latch-plate so that its free end will take edgewise into the uppermost recess $e$ and one of its broad sides will abut against the right-angle portion $c$ of the keeper. With this arrangement the shutter will be held securely in the wide-open position. Or if it is desired to hold the shutter in the partly-open or bowed position illustrated in Fig. 2 the latch-plate $h$ is turned on its screw-eye $g$ so as to present one of its broad sides uppermost and is secured to the shutter by receiving the lug $f'$ in one of its holes $j$. To hold the shutter completely closed, said lug is inserted in the innermost hole $j$.

As the end $d$ of the plate-keeper $b$ is provided in both its top and bottom edges with a recess, it is evident that said plate may be used either edge uppermost for a left-hand or right-hand shutter, thereby avoiding the necessity of having "lefts" or "rights."

Having thus described my invention, what I claim, and desire to secure by Letters Patent, is—

1. A shutter fastener and bower, comprising a latch-plate arranged to be pivotally connected at one end to a window-frame and provided at its other or free end with a plurality of holes; a keeper adapted to be secured to a shutter at the hinged edge thereof and provided at one end with a recess adapted to receive the free end of said latch-plate; and a pin adapted to be secured to the shutter and also adapted to enter any of the holes in the free end of said latch-plate, as and for the purpose set forth.

2. The combination with a window-frame and a shutter hinged thereto, of an eye secured to said window-frame; a latch-plate provided at one end with an aperture by which it is pivotally connected to said eye so as to swing therefrom and also turn broadside or edge uppermost, and said latch-plate provided at its other or free end with a plurality of holes; a plate-keeper secured to said shutter at the hinged edge thereof and provided with a right-angle portion, $c$, and an end, $d$, projecting therefrom in a plane parallel with the shutter and said end having in its upper edge a recess to receive said latch-plate edge uppermost; and a pin secured to the shutter and provided with an upwardly-extending lug adapted to enter any of said holes, as set forth.

In testimony whereof I affix my signature in the presence of two witnesses.

GILBERT C. BOLGIANO.

Witnesses:
PHILIP S. EDWARDS,
FREDERICK S. STITT.